United States Patent
Kishimoto et al.

(10) Patent No.: US 7,786,035 B2
(45) Date of Patent: *Aug. 31, 2010

(54) GLASS COMPOSITION AND PROCESS FOR PRODUCING GLASS COMPOSITION

(75) Inventors: Shoichi Kishimoto, Tokyo (JP); Haruki Niida, Tokyo (JP); Akihiro Koyama, Tokyo (JP); Yukihito Nagashima, Tokyo (JP)

(73) Assignee: AvanStrate Inc., Mie (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/990,355

(22) PCT Filed: Aug. 4, 2006

(86) PCT No.: PCT/JP2006/315535

§ 371 (c)(1),
(2), (4) Date: Jul. 1, 2008

(87) PCT Pub. No.: WO2007/020824

PCT Pub. Date: Feb. 22, 2007

(65) Prior Publication Data

US 2009/0131238 A1    May 21, 2009

(30) Foreign Application Priority Data

Aug. 15, 2005   (JP) ............................. 2005-235568
Aug. 15, 2005   (JP) ............................. 2005-235569

(51) Int. Cl.
  C03C 3/091    (2006.01)
  C03C 3/083    (2006.01)
  C03C 3/085    (2006.01)
  C03C 3/087    (2006.01)
  C03B 9/00     (2006.01)

(52) U.S. Cl. ............................. 501/66; 501/68; 501/69; 501/70; 65/66

(58) Field of Classification Search ............... 501/66, 501/68, 69, 70; 65/66
See application file for complete search history.

(56) References Cited

U.S. PATENT DOCUMENTS 6,680,266 B1 * 1/2004 Peuchert et al. ............... 501/66

(Continued)

FOREIGN PATENT DOCUMENTS

JP    60-141642 A    7/1985

(Continued)

OTHER PUBLICATIONS

English translation of International Preliminary Report on Patentability and Written Opinion of the International Searching Authority, dated Feb. 20, 2008.

*Primary Examiner*—Karl E Group
*Assistant Examiner*—Noah S Wiese
(74) *Attorney, Agent, or Firm*—Hamre, Schumann, Mueller & Larson, P.C.

(57) ABSTRACT

A glass composition which is reduced in the amount of residual bubbles and is produced using smaller amounts of an environmentally unfriendly component such as arsenic oxide and antimony oxide. This glass composition contains, in terms of mass %: 40-70% $SiO_2$; 5-20% $B_2O_3$; 10-25% $Al_2O_3$; 0-10% MgO; 0-20% CaO; 0-20% SrO; 0-10% BaO; 0-0.5% $Li_2O$; 0-1.0% $Na_2O$; 0-1.5% $K_2O$; and 0-1.5%, excluding 0%, Cl, $Li_2O+Na_2O+K_2O$ exceeding 0.06%. The glass composition can be produced suitably using, for example, a chloride as part of the raw glass materials.

23 Claims, 1 Drawing Sheet

U.S. PATENT DOCUMENTS

| | | | |
|---|---|---|---|
| 6,777,359 B2 * | 8/2004 | Yamashita et al. | 501/67 |
| 2003/0121288 A1 | 7/2003 | Naka et al. | |
| 2005/0209084 A1 | 9/2005 | Takaya et al. | |
| 2008/0090717 A1 | 4/2008 | Nagashima et al. | |
| 2008/0206494 A1 * | 8/2008 | Kurachi et al. | 428/1.62 |
| 2009/0143214 A1 * | 6/2009 | Niida et al. | 501/56 |

FOREIGN PATENT DOCUMENTS

| | | | |
|---|---|---|---|
| JP | 10-025132 A | | 1/1998 |
| JP | H10120437 A | * | 5/1998 |
| JP | 2000-128572 A | | 5/2000 |
| JP | 2002-201040 A | | 7/2002 |
| JP | 2002201040 A | * | 7/2002 |
| JP | 2003-026442 A | | 1/2003 |
| JP | 2005-089259 A | | 4/2005 |
| JP | 2005-306719 A | | 11/2005 |
| WO | WO 2006/064878 A1 | | 6/2006 |

* cited by examiner

GLASS COMPOSITION AND PROCESS FOR PRODUCING GLASS COMPOSITION

TECHNICAL FIELD

The present invention relates to a glass composition, and a process for producing a glass composition, and particularly to alumino-borosilicate glass compositions.

BACKGROUND ART

Alkali-free borosilicate glass compositions have been used as the glass compositions for the substrate of information display devices, particularly active-matrix liquid crystal display devices. A representative example of such alkali-free borosilicate glass is Code 7059 glass produced by Corning of the United States.

In manufacturing processes of glass compositions, a process that removes residual bubbles in the glass composition is generally known as fining. A method of adding a fining agent to fine a glass melt is commonly known as well. Arsenic oxide, antimony oxide, and fluorides are some of the known examples of the fining agent. In this connection, there is a social need to reduce the amount of these highly environmentally unfriendly components. For example, JP 10(1998)-25132A discloses a method in which sulfate and chloride are simultaneously added to raw glass materials for the purposes of melting and fining.

Specifically, this publication teaches adding, as fining agents, sulfate in the $SO_3$ amount of 0.005 to 1.0 weight %, and chloride in the $Cl_2$ amount of 0.01 to 2.0 weight %. The publication also teaches preparing sulfate and chloride as fining agents, and using $BaSO_4$, $CaSO_4$, and the like as the sulfate, and $BaCl_2$, $CaCl_2$, and the like as the chloride.

Meanwhile, JP 60(1985)-141642A discloses a glass composition containing as a degassing agent at least one component selected from $As_2O_3$, $Sb_2O_3$, $(NH_4)_2SO_4$, NaCl, and fluorides.

In the glass fining technique disclosed in JP 10(1998)-25132A, sulfate and chloride simultaneously are added to raw glass materials. The chloride added is an alkali earth metal chloride such as $BaCl_2$, $CaCl_2$.

However, the alkali-free borosilicate glass composition commonly used for the active-matrix liquid crystal display device is highly viscous and this has made fining of the glass difficult.

Further, components such as aluminum, boron, and silicon have characteristics that their mobility in glass is limited by the strong electrostatic binding due to the large charge. For this reason, it has been difficult to achieve good clarity in the glass of the borosilicate glass composition.

As a countermeasure to these problems, JP 60(1985)-141642A teaches using NaCl. A problem of using NaCl, however, is that sodium ions dissolve out of the glass after the glass is assembled into a liquid crystal display device, and, depending on the amount of dissolved sodium ions, the performance of the liquid crystal element may be impaired.

DISCLOSURE OF THE INVENTION

The present invention was made to solve the foregoing problems. Specifically, an object of the invention is to provide a glass composition, usable for information display devices such as a liquid crystal display device, which contains a few bubbles and is produced using reduced amounts of highly environmentally unfriendly arsenic oxide and antimony oxide. Another object of the invention is to provide a process suited for the production of such glass compositions. It is yet another object of the invention to provide a glass substrate for information display devices using the glass composition, and an information display device using the glass substrate.

A glass composition of the present invention includes small amounts of alkali metal oxide and Cl in an alumino-borosilicate glass composition.

Specifically, a glass composition according to the present invention contains, in mass %, 40 to 70% $SiO_2$, 5 to 20% $B_2O_3$, 10 to 25% $Al_2O_3$, 0 to 10% MgO, 0 to 20% CaO, 0 to 20% SrO, and 0 to 10% BaO, and further contains greater than 0.06% $R_2O$, and greater than 0% and no greater than 1.5% Cl, where R is at least one kind selected from Li, Na, and K, and $Li_2O$ falls in a range of 0 to 0.5%, $Na_2O$ falls in a range of 0 to 1.0%, and $K_2O$ falls in a range of 0 to 1.5%, all in mass %.

As a process suited for the production of the glass composition, the present invention provides a process for producing a glass composition. The process includes a step of melting a raw glass material to obtain a glass composition. The glass composition contains, in mass %, 40 to 70% $SiO_2$, 5 to 20% $B_2O_3$, 10 to 25% $Al_2O_3$, 0 to 10% MgO, 0 to 20% CaO, 0 to 20% SrO, and 0 to 10% BaO and further contains greater than 0.06% $R_2O$, where R is at least one kind selected from Li, Na, and K, and $Li_2O$ falls in a range of 0 to 0.5%, $Na_2O$ falls in a range of 0 to 1.0%, and $K_2O$ falls in a range of 0 to 1.5%, all in mass %. A chloride is used as part of the raw glass material.

In another aspect, the present invention provides a glass substrate for information display devices, which consists of the glass composition. In another aspect, the present invention provides an information display device including the glass substrate for information display devices.

With the present invention, a sufficient fining effect can be obtained in an alumino-borosilicate glass composition without using, or using only a limited amount of, highly environmentally unfriendly components as represented by arsenic oxide. The present invention provides ways to produce glass substrates for large information display devices readily at high yield and low cost, while avoiding use of highly environmentally unfriendly components.

BEST MODE FOR CARRYING OUT THE INVENTION

Figure 1:
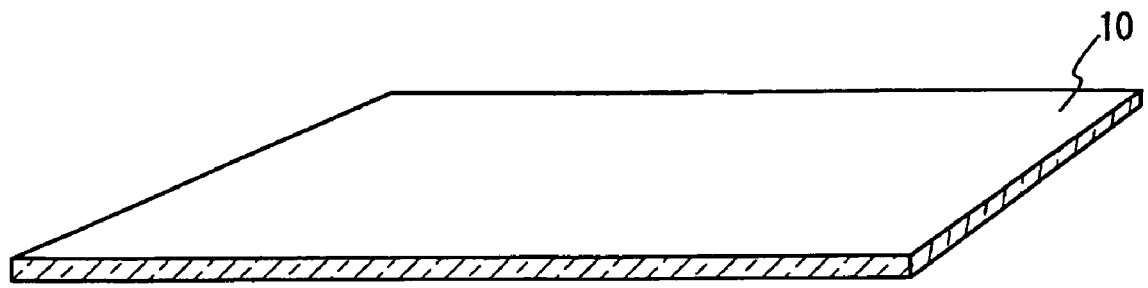
FIG. 1 is a perspective view showing an example of a glass substrate for information display devices, formed from a glass composition of the present invention.

In the following, the percentage denoting the content of each component of a glass composition and raw glass material is percent by mass.

A glass composition of the present invention can be produced using chloride as part of raw glass materials. Preferably, chlorine is contained in the glass composition by melting a batch of raw glass material that has been prepared to include chloride, particularly alkali metal chloride and/or alkali earth metal chloride. In this way, chlorine effectively can exhibit its fining effect in the glass melt.

The chloride is preferably at least one compound selected from, for example, magnesium chloride, calcium chloride, strontium chloride, barium chloride, lithium chloride, sodium chloride, and potassium chloride, more preferably lithium chloride, sodium chloride, and potassium chloride, and even more preferably potassium chloride. The chloride also may be at least one compound selected from magnesium chloride, calcium chloride, strontium chloride, and barium chloride. The chloride content in a raw glass material is desirably in a range of greater than 0% to no greater than 1.5%, preferably 0.05 to 1.5%, and more preferably greater than 0.09% to no greater than 1.5%. In this way, chlorine effectively can exhibit its fining effect in the glass melt.

Though the mechanism of the fining action by chloride is not entirely clear, the inventors of the present invention have proposed the following explanation.

The boiling point of chloride, particularly alkali metal chloride is near the temperature range of, for example, 1400° C. to 1650° C. suited for the melting of a glass composition of the present invention. LiCl has a boiling point in a range of 1325° C. to 1360° C., and NaCl has a boiling point of 1413° C. KCl sublimes at 1500° C. That is, in a suitable melting temperature range of a glass composition of the present invention, the vapor pressures of these alkali metal chlorides are considered to increase to levels comparable to atmospheric pressure.

It is therefore possible that, in the process of melting a glass composition of the present invention, the chlorine would bind to the alkali in the glass melt and generate an alkali metal chloride gas. The alkali metal chloride gas forms bubbles in the glass melt, or increases the size of bubbles in the glass melt. These bubbles would then float to the surface of the glass melt and burst, with the result that the bubbles are removed from the glass melt. It is considered that the fining of the glass composition proceeds due to this mechanism.

Meanwhile, because Cl is volatile, the Cl content is often greater in the raw glass material than in the product glass. When the raw glass material contains a trace amount of Cl, hardly any Cl may remain in the product glass.

Like other alkali components, KCl is a monovalent salt and therefore is subject to weak electric binding in the molten glass. However, because potassium has a greater ion radius than sodium, its mobility is limited by the steric hinderance in the dense structure of the glass composition that has undergone volume shrinkage as a result of cooling from the molten state.

This accounts for the superior characteristics of KCl that it can freely move in the molten glass at high temperatures and enter the bubbles to exhibit degassing effects, and that dissolution does not occur easily by the limited mobility in the glass composition.

Further, KCl vaporizes at higher temperatures compared with NaCl. That is, KCl vaporizes in a temperature range where the glass has low viscosity. Generally, this makes use of KCl particularly advantageous for the fining of high-viscosity glass.

Meanwhile, in a vacuum fining technique in which the glass melt is degassed under reduced pressure atmosphere, a fining vessel is used that has a complex structure for sealing or other purposes. In this case, fining should be performed preferably in a lower temperature range (1450° C. to 1500° C.) than normal fining temperatures (1600° C. or greater). In this respect, the use of KCl is particularly advantageous for vacuum fining, because KCl is more weakly bound by charges than alkali earth metal chloride and therefore moves more freely in high-viscosity molten glass.

Alkali metal oxides such as $Li_2O$, $Na_2O$, and $K_2O$ dissolve out of the glass and adversely affect other members. For this reason, alkali metal oxides have been excluded from the glass composition in applications as the glass substrate for liquid crystal display devices. However, when the alkali metal oxides are used in trace amounts, the glass fining effect can be improved while suppressing the influence of dissolution from the glass at a level that would not cause any practical problem. This is because the alkali metal oxides lower the viscosity of the glass and contribute to facilitating decomposition of silica, which does not easily decompose in the raw glass material. It is preferable that the $K_2O$ content in the glass composition be adjusted to be at least equal to the $Na_2O$ content, more preferably sufficiently greater than the $Na_2O$ content, or more specifically at least two times, more preferably at least three times, and even more preferably at least four times the $Na_2O$ content. By thus limiting the content of $Na_2O$ that has a relatively large mobility rate in glass, dissolution of alkali metal from the glass can be suppressed more effectively. From the same reasoning, it is preferable to adjust the $Li_2O$ content to be less than the $Na_2O$ content, and more preferably less than half of the $Na_2O$ content.

It is preferable that the glass composition contains two or more kinds of alkali metal oxides. With two or more kinds of alkali metal oxides present in the glass composition, the mobility rate of the alkali metal ions can be reduced more effectively by the combined alkaline effect. This further reduces the dissolution of the alkali metals or alkali metal ions from the glass composition, thereby enhancing the chemical durability of the glass composition.

The following will describe each component of the glass composition.

($SiO_2$)

$SiO_2$ is an essential component as a glass network former, and it has the effect of enhancing chemical durability and heat resistance of the glass. This effect cannot be obtained sufficiently when the $SiO_2$ content is less than 40%. When the $SiO_2$ content exceeds 70%, the glass readily undergoes devitrification. This makes it difficult to mold the glass, and the increased viscosity makes it difficult to homogenize the glass. Therefore, the $SiO_2$ content should be 40 to 70%, preferably 58 to 70%, 57 to 65%, 60 to 65%, 56 to 65%, and 56 to 60%.

($B_2O_3$)

$B_2O_3$ is an essential component that lowers the viscosity of the glass and facilitates decomposition and fining of the glass. This effect cannot be obtained sufficiently when the $B_2O_3$ content is less than 5%. When the $B_2O_3$ content exceeds 20%, acid resistance of the glass deteriorates and vaporization occurs rapidly, which makes it difficult to homogenize the glass. Therefore, $B_2O_3$ content should be 5 to 20%, preferably 8 to 13%, and 5 to 12%.

($Al_2O_3$)

$Al_2O_3$ is an essential component as a glass network former, and it has the effect of enhancing chemical durability and heat resistance of the glass. This effect cannot be obtained sufficiently when the $Al_2O_3$ content is less than 5%. When the $Al_2O_3$ content exceeds 25%, viscosity of the glass lowers and acid resistance deteriorates. Therefore, $Al_2O_3$ content should be 10 to 25%, preferably 13 to 20%, 10 to 20%, and 10 to 18%.

(MgO, CaO)

MgO and CaO are optional components that lower viscosity of the glass and facilitate decomposition and fining of the glass. When the MgO content and the CaO content exceed 10% and 20%, respectively, the chemical durability of the glass deteriorates. Therefore, the MgO content should be 0 to 10%, and the CaO content should be 0 to 20%.

To improve the fining effect by chloride, both MgO and CaO preferably should be contained in the amount of at least 1%. The MgO content may be 5 to 10%. In order to prevent glass devitrification, the MgO content preferably should be no greater than 5% and the CaO content preferably should be no greater than 10%. For example, the MgO content is more preferably 1 to 5%, and the CaO content is more preferably 1 to 10%. Even more preferably, the CaO content is 1 to 6%, and the MgO content is less than 5%.

(SrO, BaO)

SrO and BaO are optional components that lower viscosity of the glass and facilitate decomposition and fining of the glass. When the SrO content and the BaO content exceed 20% and 10%, respectively, the chemical durability of the glass deteriorates. Further, because of large ion radii, there are cases where SrO and BaO hinder mobility of potassium and chloride ions in the glass, which makes it difficult to fine the glass. Therefore, the SrO content should be 0 to 20%, preferably 0 to 4%, more preferably 1 to 10%, and even more preferably 1 to 6%. The BaO content should be 0 to 10%, more preferably 0 to 1%. The BaO content may be 3 to 10%.

($K_2O$, $Na_2O$)

$K_2O$ is a component that lowers glass viscosity and facilitates fining of the glass. $K_2O$ binds to the chlorine ions in the glass melt and vaporizes in the form of potassium chloride at temperatures of 1500° C. or greater. This facilitates increasing the size of bubbles in the glass and causes the bubbles to float to the surface. By this flow action, $K_2O$ also serves to homogenize the glass melt. The $K_2O$ content may be 0%. However, the $K_2O$ content preferably should be 0.05% or greater, more preferably 0.07% or greater. Meanwhile, there are cases where $K_2O$ increases the thermal expansion coefficient of the glass. In order to prevent a difference in the thermal expansion coefficient from silicone materials, the $K_2O$ content is desirably no greater than 1.5%. That is, the $K_2O$ content may be 0.05 to 1.5%.

Unlike other alkali metal oxides such as $Na_2O$ and $Li_2O$, $K_2O$ has a small mobility rate in glass and does not easily dissolve out of the glass. This allows the $K_2O$ to be contained in the glass substrate for information display devices such as a liquid crystal display device. In order to suppress dissolution of alkali metal oxides from the glass, the $Na_2O$ content is desirably no greater than the $K_2O$ content, as described above. The $Na_2O$ content is 0 to 1.0%, preferably 0 to 0.5%, and more preferably 0 to 0.1%.

($Li_2O$)

$Li_2O$ is an optional component that lowers glass viscosity and facilitates fining of the glass. As in the case of $K_2O$, $Li_2O$ vaporizes in the form of lithium chloride and increases the size of bubbles in the glass and causes the bubbles to float to the surface. At the same time, $Li_2O$ also serves to homogenize the glass melt. By adding a trace amount of $Li_2O$ (for example, 0.015%), the volume resistivity of the glass composition can be reduced. The $Li_2O$ content is 0 to 0.5%, preferably no greater than 0.07%. That is, the $Li_2O$ content may be 0.015 to 0.5%.

(Cl)

The Cl content may be in a range exceeding 0%. However, because Cl is a component that can facilitate fining of the glass, the Cl content is preferably 0.04% or greater, more preferably greater than 0.09%. The mechanism of fining the glass by Cl is as given above.

Because Cl is volatile, the Cl content is often greater in the raw glass material than in the product glass. For this reason, a raw glass material batch should contain Cl in the amount of 0.05% or greater. However, since Cl does not readily decompose into the glass, condensation may occur in the glass being formed when the Cl content exceeds 1.5%. This may lead to formation of bubbles containing chloride crystals, or may encourage phase separation or devitrification of the glass. It is therefore desirable that the Cl content be no greater than 1.5%.

The potassium as the constituting element of $K_2O$, and Cl may be supplied from different source materials. However, the absolute fractions of these elements are so small that they compete with other ions for the binding reaction, with the result that the binding of these elements may not proceed sufficiently.

On the other hand, when the source material of K and Cl added to the raw glass material is potassium chloride (KCl), K and Cl can exist as KCl from an early stage of melting. This is advantageous for the fining because bubbles are formed rapidly when the glass temperature exceeds the boiling point of KCl. It is therefore preferable that KCl be used as the source material of K and Cl.

(Combined Alkaline Effect)

The total content of alkali metal oxides (for example, the $R_2O$ content representing the total content of $Li_2O$, $Na_2O$, and $K_2O$) is desirably in a range of greater than 0.06% to no greater than 1.5%, preferably greater than 0.07% and no greater than 1.5%. The $R_2O$ content may be in a range exceeding 0.2%.

It should be noted however that $Li_2O$, $Na_2O$, and $K_2O$ are all alkali metal oxides and therefore the cations move more freely in the glass than other metal cations.

Among these alkali metal oxides, $K_2O$ has the slowest mobility rate in glass. By containing $K_2O$ in the glass composition with $Li_2O$ or $Na_2O$, chemical durability of the glass composition can be improved, as described above.

Further, with more than one kind of alkali metal oxide used together, a superior fining effect can be obtained as compared with adding only one kind of alkali metal oxide. Such a superior fining effect will be even more prominent when $K_2O$ and $Li_2O$ are used together.

(Other Components)

A glass composition of the present invention may contain any of the foregoing glass components in the defined ranges, and, essentially, preferably only the foregoing glass components are contained in the defined ranges. However, other components also may be contained for the purposes of controlling refractive index and temperature viscosity characteristics and preventing devitrification, for example. As such additional components, ZnO, $SnO_2$, $TiO_2$, $Y_2O_3$, $La_2O_3$, $Ta_2O_5$, $Nb_2O_5$, $GeO_2$, or $Ga_2O_5$ may be contained in the total amount of at most 3%. In certain cases, addition of ZnO may not be preferable. Further, oxides of As or Sb may be contained, as will be described later. $Fe_2O_3$ also may be contained in a range of less than 0.5%. NiO may be contained in a range of less than 0.05%. CoO may be contained in a range of less than 0.01%. In certain cases, Mo may be contained in a range of less than 0.02%.

The glass composition may be a composition that essentially comprises the foregoing component groups (a group of components $SiO_2$ to Cl individually described above, and a group of components ZnO to Mo given in the foregoing paragraph). In this case, the glass composition does not essentially include components other than these component groups.

As used herein, the language "does not essentially include" is intended to encompass inclusion of a trace amount of impurity that is inevitable in industrial manufacturing. Specifically, it is intended that a trace amount of impurity is contained in the amount of less than 0.05%, preferably less than 0.03%, and more preferably less than 0.01%.

With a glass composition of the present invention, the amount of arsenic oxide or antimony oxide used can be reduced while at the same time realizing desirable glass clarity. However, the present invention should not be understood to completely exclude As, Sb, or other highly environmentally unfriendly components. Though it is preferable that a glass composition of the present invention does not essentially contain oxides of arsenic and antimony, the present invention is not limited to this. As will be described later in Examples, a glass composition of the present invention may include oxides of arsenic and/or antimony. For example, oxides of arsenic may be contained in the $As_2O_3$ amount of greater than 0% to no greater than 0.1%. Oxides of antimony, not as environmentally unfriendly as arsenic, may be contained in the $Sb_2O_3$ amount of greater than 0% to less than 0.4%, as will be described later in Examples.

As to the content of each component $SiO_2$ to BaO in the foregoing component group, the content may be, for example, 58 to 70% $SiO_2$, 8 to 13% $B_2O_3$, 13 to 20% $Al_2O_3$, 1 to 5% MgO, 1 to 10% CaO, 0 to 4% SrO, and 0 to 1% BaO.

Further, in the component group, the content may be, for example, 57 to 65% $SiO_2$, 5 to 12% $B_2O_3$, 10 to 20% $Al_2O_3$, 5 to 10% MgO, 0 to 10% CaO, and 0 to 10% SrO.

Further, in the component group, the content may be, for example, 60 to 65% $SiO_2$, 5 to 12% (preferably 9 to 12%) $B_2O_3$, 10 to 20% (preferably 10 to 15%) $Al_2O_3$, 0 to 5% (preferably 1 to 5%, more preferably 2 to 4.5%) MgO, 1 to 6% CaO, 0 to 10% SrO, and 0 to 1% BaO.

Further, in the component group, the content may be, for example, 56 to 65% $SiO_2$, 5 to 12% $B_2O_3$, 10 to 18% $Al_2O_3$, 0 to 5% (preferably 2 to 5%) MgO, 1 to 10% CaO, 1 to 10% (preferably, 3 to 10%) SrO, and 0 to 1% BaO.

Further, in the component group, the content may be, for example, 56 to 60% $SiO_2$, 5 to 12% $B_2O_3$, 10 to 18% $Al_2O_3$, 0 to 5% MgO, 1 to 6% CaO, 1 to 6% SrO, and 3 to 10% BaO.

Further, in the component group, the content may be, for example, 58 to 64% $SiO_2$, 8 to 12% $B_2O_3$, 5 to 18% (preferably, 15 to 18%) $Al_2O_3$, 1 to 10% (preferably 1 to 5%, more preferably 1 to 2%) MgO, 1 to 6% (preferably 3 to 8%) CaO, 1.5 to 4.5% (preferably 2 to 4%) SrO, and 1 to 5% (preferably 1 to 4%) BaO.

A method for forming a glass composition of the present invention is not particularly limited. The downdraw process or fusion process may be used.

Figure 2:
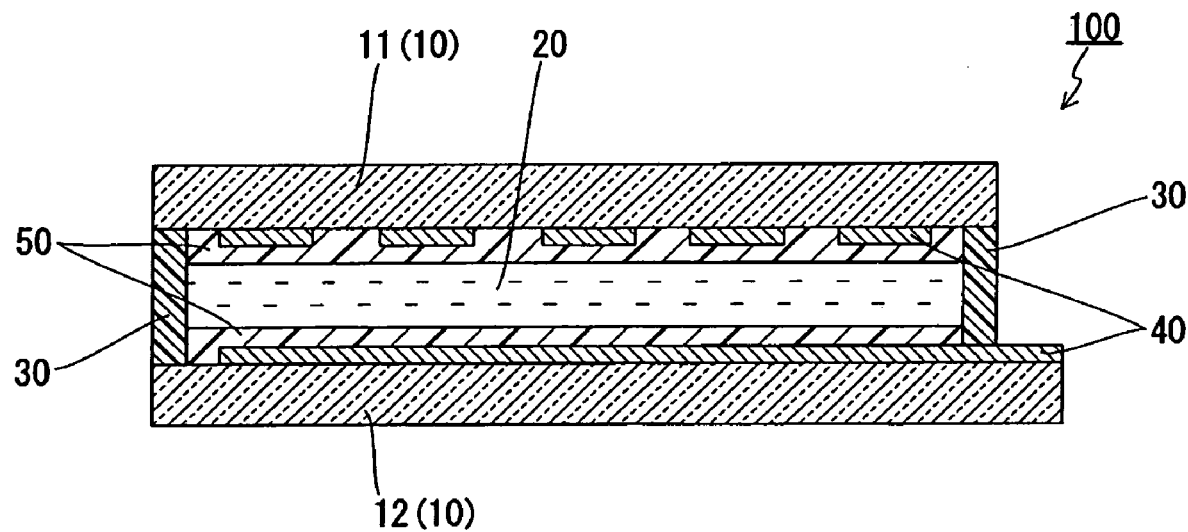
FIG. 2 is a cross sectional view of an information display device, showing an exemplary use of the glass substrate for information display devices of FIG. 1.

A glass composition of the present invention can be used suitably as a glass substrate 10 for large and thin information display devices such as a liquid crystal display device and a plasma display panel, as shown in FIG. 1. The glass substrate 10 may be used, for example, as a front panel 11 and a back panel 12 of a liquid crystal display device 100, illustrated in FIG. 2 as an example of an information display device. As shown in FIG. 2, the front panel 11 and the back panel 12 provided for the liquid crystal display device 100 are disposed on the both sides of a liquid crystal layer 20 with a sealant 30 in between, together with other members such as transparent electrodes 40 and alignment films 50.

The following will describe an embodiment of the present invention based on examples. It should be noted, however, that the present invention is not limited by the following description.

EXAMPLES 1 to 12

Comparative Examples 1 to 3

In Examples 1 to 12 and Comparative Examples 1 to 3, confirmation was made as to how the inclusion of small amounts of alkali metal oxide and Cl would affect the fining effect.

Batches of raw glass materials (may be referred to as "batches" hereinafter) shown in Table 1A and Table 1B were prepared. As common raw glass materials, silica, boric anhydride, alumina, basic magnesium carbonate, calcium carbonate, strontium carbonate, and barium carbonate were used. As Cl sources, potassium chloride, calcium chloride, sodium chloride, lithium chloride, and the like were used.

TABLE 1A

| | | Ex. 1 | Ex. 2 | Ex. 3 | Ex. 4 | Ex. 5 | Ex. 6 | Comparative Example 1 | Comparative Example 2 |
|---|---|---|---|---|---|---|---|---|---|
| Blend ratio [g/batch] | Silicon oxide | 59.0 | 59.0 | 59.0 | 59.6 | 59.4 | 58.9 | 59.0 | 59.9 |
| | Boric anhydride | 8.8 | 8.8 | 8.8 | 9.5 | 9.4 | 9.4 | 8.9 | 9.5 |
| | Aluminum oxide | 17.0 | 17.0 | 17.0 | 15.2 | 15.1 | 15.0 | 17.0 | 15.2 |
| | Magnesium carbonate | 6.0 | 5.9 | 5.9 | 3.8 | 3.8 | 3.8 | 6.0 | 3.8 |
| | Calcium carbonate | 6.5 | 5.9 | 5.9 | 9.1 | 9.0 | 8.9 | 6.5 | 9.1 |
| | Strontium carbonate | 2.1 | 2.1 | 2.1 | 2.4 | 2.4 | 2.4 | 2.1 | 2.4 |
| | Barium carbonate | — | — | — | — | — | — | — | — |
| | Lithium chloride | — | — | — | — | — | — | — | — |
| | Sodium chloride | — | — | — | — | — | — | — | — |
| | Calcium chloride | — | 0.6 | — | — | — | — | 0.6 | — |
| | Potassium chloride | 0.8 | 0.8 | 1.7 | 0.4 | 0.9 | 1.7 | — | — |

TABLE 1B

| | | Ex. 7 | Ex. 8 | Ex. 9 | Ex. 10 | Ex. 11 | Ex. 12 | Comparative Example 3 |
|---|---|---|---|---|---|---|---|---|
| Blend ratio [g/batch] | Silicon oxide | 54.7 | 54.5 | 54.0 | 54.5 | 54.6 | 54.4 | 54.9 |
| | Boric anhydride | 11.0 | 10.9 | 10.8 | 10.9 | 10.9 | 10.9 | 11.0 |
| | Aluminum oxide | 13.8 | 13.8 | 13.6 | 13.8 | 13.8 | 13.7 | 13.9 |
| | Magnesium carbonate | 1.2 | 1.2 | 1.1 | 1.2 | 1.2 | 1.2 | 1.2 |
| | Calcium carbonate | 7.7 | 7.6 | 7.6 | 7.6 | 7.7 | 7.6 | 7.7 |
| | Strontium carbonate | 4.0 | 4.0 | 4.0 | 4.0 | 4.0 | 4.0 | 4.1 |
| | Barium carbonate | 7.3 | 7.3 | 7.2 | 7.3 | 7.3 | 7.3 | 7.3 |
| | Lithium chloride | — | — | — | — | 0.2 | 0.2 | — |
| | Sodium chloride | — | — | — | 0.3 | — | 0.3 | — |
| | Calcium chloride | — | — | — | — | — | — | — |
| | Potassium chloride | 0.4 | 0.8 | 1.6 | 0.4 | 0.4 | 0.4 | — |

Each batch was melted and fined in a platinum crucible. First, the crucible was placed in an electric furnace that had been set at 1600° C., and maintained therein for 16 hours to melt the batch. The crucible with the glass melt was taken out of the furnace and allowed to cool and solidify at room temperature. As a result, a glass body was obtained. The glass body was taken out of the crucible and gradually cooled. The cooling was performed according to the following procedure. The glass body was placed in a separate electric furnace that had been set at 700° C., and maintained therein for 30 minutes. The glass body was then allowed to cool to room temperature by turning off the electric furnace. The resulting glass body was used as a sample glass.

(Quantification of Glass Composition)

The sample glass was comminuted to quantify the glass composition by fluorescent x-ray analysis using RIX3001 from Rigaku Corporation. Note that, boron (B) was quantified by emission spectral analysis using ICPS-10001V of Shimadzu Corporation.

(Evaluation of Clarity)

The clarity of the glass body was evaluated through observation of the sample glass with an optical microscope (40×) and by finding the number of bubbles per 1 cm$^3$ of glass from thickness, view area, and the number of bubbles observed. There are difficulties in evaluating the fining effect in the absolute sense because it varies depending on the type of base composition glass. As such, evaluation was made by comparing each Example with Comparative Examples of similar compositions. Clarity (bubble conditions) was denoted as "Excellent" when the relative ratio of the bubble count observed in Examples was less than 0.5, "Good" when 0.5 or greater and less than 1.0, and "Poor" when 1.0 or greater.

Specifically, the sample glasses of Examples 1 to 6 were compared with the bubble conditions of Comparative Examples 1 and 2. The sample glasses of Examples 7 to 12 were compared with the bubble conditions of Comparative Example 3.

Since this method is based on simple decomposition using a crucible, the bubble count is much greater than the numbers of bubbles actually contained in a commercially produced glass body. Nevertheless, it is known that the number of bubbles contained in the commercially produced glass body will be small when the bubble count determined based on this method is small. It is therefore possible to use this method for the measurement of clarity evaluation.

(Measurement of Thermal Expansion Coefficient and Glass Transition Point)

By a common glass processing technique, the sample glass was processed into a cylindrical glass piece ($\phi$=5 mm, 15 mm in length). A thermal expansion coefficient and a glass transition point were measured by raising the temperature at a rate of 5° C./min, using a differential dilatometer (Thermoflex TMA8140, Rigaku Corporation).

The sample glasses of Examples 1 to 12 had the compositions shown in Table 2A and Table 2B. The number of residual bubbles in the sample glasses of Examples 1 to 12 was considerably fewer than that in the Comparative Examples. Further, the sample glasses of Examples 1 to 12 are free from arsenic oxide or other environmentally highly unfriendly fining agents. Taken together, the present invention enables manufacture of glass substrates that have very few defects due to bubbles or other deficiencies, without using, or using a reduced amount of, arsenic oxide and the like.

TABLE 2A

| | | Ex. 1 | Ex. 2 | Ex. 3 | Ex. 4 | Ex. 5 | Ex. 6 | Comparative Example 1 | Comparative Example 2 |
|---|---|---|---|---|---|---|---|---|---|
| Composition [mass %] | SiO$_2$ | 63.3 | 63.2 | 63.2 | 64.9 | 64.8 | 64.2 | 63.4 | 65.2 |
| | B$_2$O$_3$ | 8.6 | 8.6 | 8.6 | 9.1 | 9.1 | 9.0 | 8.6 | 9.1 |
| | Al$_2$O$_3$ | 18.7 | 18.7 | 18.7 | 16.6 | 16.5 | 16.3 | 18.7 | 16.6 |
| | MgO | 3.1 | 3.1 | 3.1 | 1.7 | 1.6 | 1.6 | 3.1 | 1.7 |
| | CaO | 3.9 | 3.8 | 3.5 | 5.5 | 5.5 | 5.5 | 4.3 | 5.6 |

TABLE 2A-continued

|  | Ex. 1 | Ex. 2 | Ex. 3 | Ex. 4 | Ex. 5 | Ex. 6 | Comparative Example 1 | Comparative Example 2 |
|---|---|---|---|---|---|---|---|---|
| SrO | 1.6 | 1.6 | 1.6 | 1.8 | 1.8 | 1.8 | 1.6 | 1.8 |
| BaO | — | — | — | — | — | — | — | — |
| $Li_2O$ | — | — | — | — | — | — | — | — |
| $Na_2O$ | — | — | — | — | — | — | — | — |
| $K_2O$ | 0.50 | 0.48 | 0.87 | 0.29 | 0.59 | 1.17 | — | — |
| Cl | 0.27 | 0.52 | 0.49 | 0.09 | 0.18 | 0.35 | 0.30 | — |
| Glass transition point [° C.] | 747 | 747 | 742 | 745 | 742 | 738 | 755 | 748 |
| Thermal expansion coefficient [×10$^{-7}$/° C.] | 33 | 33 | 33 | 34 | 35 | 37 | 34 | 33 |
| Bubble condition | Good | Good | Excellent | Good | Excellent | Excellent | Poor | Poor |

TABLE 2B

|  |  | Ex. 7 | Ex. 8 | Ex. 9 | Ex. 10 | Ex. 11 | Ex. 12 | Comparative Example 3 |
|---|---|---|---|---|---|---|---|---|
| Composition [mass %] | $SiO_2$ | 59.6 | 59.4 | 59.0 | 59.4 | 59.5 | 59.3 | 59.8 |
|  | $B_2O_3$ | 10.6 | 10.5 | 10.4 | 10.5 | 10.5 | 10.5 | 10.5 |
|  | $Al_2O_3$ | 15.0 | 15.0 | 14.9 | 15.1 | 15.1 | 15.0 | 15.1 |
|  | MgO | 0.5 | 0.5 | 0.5 | 0.5 | 0.5 | 0.5 | 0.5 |
|  | CaO | 4.7 | 4.7 | 4.6 | 4.7 | 4.7 | 4.7 | 4.7 |
|  | SrO | 3.1 | 3.1 | 3.1 | 3.1 | 3.1 | 3.1 | 3.1 |
|  | BaO | 6.2 | 6.2 | 6.1 | 6.2 | 6.2 | 6.1 | 6.2 |
|  | $Li_2O$ | — | — | — | — | 0.09 | 0.09 | — |
|  | $Na_2O$ | — | — | — | 0.18 | — | 0.18 | — |
|  | $K_2O$ | 0.28 | 0.56 | 1.11 | 0.28 | 0.28 | 0.28 | — |
|  | Cl | 0.09 | 0.17 | 0.33 | 0.17 | 0.17 | 0.25 | — |
| Glass transition point [° C.] |  | 729 | 726 | 722 | 724 | 722 | 717 | 732 |
| Thermal expansion coefficient [×10$^{-7}$/° C.] |  | 38 | 39 | 41 | 39 | 39 | 40 | 37 |
| Bubble condition |  | Good | Good | Excellent | Excellent | Excellent | Excellent | Poor |

The sample glass of Comparative Example 1 has the composition shown in Table 2A. This glass body was fined using $CaCl_2$ as the Cl source and does not contain $R_2O$. The sample glass of Comparative Example 1 had large numbers of residual bubbles, which accounted for poor clarity.

The sample glasses of Comparative Examples 2 and 3 have the compositions shown in Table 2A and Table 2B, respectively. These glass bodies were formed without using chlorides of alkali metals and do not contain Cl and $R_2O$. The sample glasses of Comparative Examples 2 and 3 had considerably large numbers of residual bubbles, which accounted for very poor clarity.

EXAMPLES 13 to 21

Comparative Examples 4 to 6

In Examples 13 to 21 and Comparative Examples 4 to 6, suitable composition ranges of the glass composition were confirmed. At the same time, the glass compositions were evaluated comprehensively by considering various factors together, such as Glass transition point, thermal expansion coefficient, and bubble conditions, taking into consideration applications as a glass substrate for information display devices.

Batches shown in Table 3 were prepared using the same materials used in Examples 1 to 12 and Comparative Examples 1 to 3.

TABLE 3

|  |  | Ex. 13 | Ex. 14 | Ex. 15 | Ex. 16 | Ex. 17 | Ex. 18 | Ex. 19 | Ex. 20 | Ex. 21 | Comparative Example 4 | Comparative Example 5 | Comparative Example 6 |
|---|---|---|---|---|---|---|---|---|---|---|---|---|---|
| Blend ratio [g/batch] | Silicon oxide | 54.91 | 59.22 | 54.33 | 55.27 | 52.75 | 52.90 | 56.76 | 54.18 | 50.05 | 42.73 | 42.29 | 64.18 |
|  | Boric anhydride | 11.25 | 9.68 | 11.18 | 10.77 | 11.11 | 9.80 | 12.73 | 8.44 | 6.81 | 9.09 | 23.76 | 4.21 |
|  | Aluminum oxide | 9.68 | 15.12 | 13.76 | 11.41 | 12.00 | 15.47 | 13.86 | 16.22 | 10.80 | 11.66 | 7.65 | 9.84 |
|  | Magnesium carbonate | 8.68 | 3.85 | 1.13 | 8.74 | 9.75 | 5.56 | 4.53 | 2.29 | 16.62 | 29.00 | 10.48 | 8.82 |
|  | Calcium carbonate | 6.25 | 9.12 | 7.66 | 6.30 | 8.55 | 11.82 | 4.82 | 12.84 | 4.46 | 6.91 | 6.09 | 4.77 |
|  | Strontium carbonate | 8.02 | 2.34 | 4.03 | 6.86 | 5.20 | 3.81 | 4.88 | 1.93 | 10.64 | — | 4.78 | 3.93 |

TABLE 3-continued

|  | Ex. 13 | Ex. 14 | Ex. 15 | Ex. 16 | Ex. 17 | Ex. 18 | Ex. 19 | Ex. 20 | Ex. 21 | Comparative Example 4 | Comparative Example 5 | Comparative Example 6 |
|---|---|---|---|---|---|---|---|---|---|---|---|---|
| Barium carbonate | 0.56 | — | 7.26 | — | — | — | 1.76 | 3.45 | — | — | 4.33 | 3.58 |
| Lithium chloride | 0.081 | 0.084 | 0.080 | 0.082 | 0.081 | 0.081 | 0.082 | 0.081 | 0.078 | 0.078 | 0.077 | 0.084 |
| Sodium chloride | 0.064 | 0.066 | 0.062 | 0.064 | 0.063 | 0.063 | 0.064 | 0.063 | 0.061 | 0.061 | 0.061 | 0.066 |
| Potassium chloride | 0.505 | 0.522 | 0.496 | 0.508 | 0.504 | 0.504 | 0.511 | 0.502 | 0.487 | 0.484 | 0.481 | 0.521 |

(Preparation and Analysis of Sample Glass)

Preparation of sample glasses, quantitative analysis of sample glass compositions, clarity evaluation, and measurements of thermal expansion coefficient and glass transition point were performed in the same manner as in Examples 1 to 12 and Comparative Examples 1 to 3. Note, however, that the evaluation of bubble conditions for the sample glasses of Examples 13 to 21 that had varying compositions over a wide range was performed by comparing with Comparative Example 6, because the other Comparative Examples did not have compositions close to the compositions of Examples 13 to 21.

(Measurement of Devitrification Temperature)

Measurement of devitrification temperature was performed as follows. First, the sample glass was comminuted with a mortar. Then, glass particles that passed a 2380 μm mesh sieve but did not pass a 1000 μm mesh sieve were collected from the comminuted sample glasses (glass particles). The glass particles so collected were subjected to ultrasonic washing in ethanol and dried to prepare a measurement sample. The measurement sample (25 g) was placed on a platinum board (12 mm in width, 200 mm in length) and put in a temperature gradient furnace where the measurement sample was held for 2 hours. The glass was taken out of the furnace and crystals that grew in the glass (devitrification) were observed with an optical microscope. A maximum temperature at which crystals were observed was given as a devitrification temperature.

TABLE 4

|  |  | Ex. 13 | Ex. 14 | Ex. 15 | Ex. 16 | Ex. 17 | Ex. 18 | Ex. 19 |
|---|---|---|---|---|---|---|---|---|
| Composition [mass %] | $SiO_2$ | 62.6 | 64.8 | 59.5 | 62.7 | 60.6 | 59.7 | 62.2 |
|  | $B_2O_3$ | 10.9 | 9.0 | 10.5 | 10.4 | 10.9 | 9.4 | 11.9 |
|  | $Al_2O_3$ | 11.0 | 16.5 | 15.0 | 12.9 | 13.7 | 17.4 | 15.1 |
|  | MgO | 4.0 | 1.7 | 0.5 | 4.0 | 4.5 | 2.5 | 2.0 |
|  | CaO | 4.0 | 5.6 | 4.7 | 4.0 | 5.5 | 7.4 | 2.9 |
|  | SrO | 6.4 | 1.8 | 3.1 | 5.4 | 4.2 | 3.0 | 3.7 |
|  | BaO | 0.5 | — | 6.2 | — | — | — | 1.5 |
|  | $Li_2O$ | 0.03 | 0.03 | 0.03 | 0.03 | 0.03 | 0.03 | 0.03 |
|  | $Na_2O$ | 0.04 | 0.04 | 0.04 | 0.04 | 0.04 | 0.04 | 0.04 |
|  | $K_2O$ | 0.36 | 0.36 | 0.34 | 0.36 | 0.36 | 0.36 | 0.35 |
|  | Cl | 0.16 | 0.16 | 0.15 | 0.16 | 0.16 | 0.16 | 0.15 |
| Glass transition point [° C.] | | 657 | 714 | 696 | 668 | 666 | 692 | 678 |
| Thermal expansion coefficient [×$10^{-7}$/° C.] | | 39 | 29 | 35 | 40 | 38 | 42 | 33 |
| Devitrification temperature [° C.] | | 1027 | <947 | <946 | <895 | <893 | <898 | <893 |
| Bubble condition | | Excellent | Good | Excellent | Good | Excellent | Excellent | Good |
| Overall evaluation | | Excellent | Excellent | Excellent | Excellent | Excellent | Excellent | Excellent |

|  |  | Ex. 20 | Ex. 21 | Comparative Example 4 | Comparative Example 5 | Comparative Example 6 |
|---|---|---|---|---|---|---|
| Composition [mass %] | $SiO_2$ | 60.1 | 59.8 | 54.7 | 49.8 | 71.4 |
|  | $B_2O_3$ | 8.0 | 6.9 | 9.9 | 23.9 | 4.0 |
|  | $Al_2O_3$ | 17.9 | 12.9 | 14.9 | 9.0 | 10.9 |
|  | MgO | 1.0 | 8.0 | 14.9 | 5.0 | 3.9 |
|  | CaO | 7.9 | 3.0 | 4.9 | 4.0 | 3.0 |
|  | SrO | 1.5 | 8.9 | — | 3.9 | 3.1 |
|  | BaO | 3.0 | — | — | 4.0 | 3.1 |
|  | $Li_2O$ | 0.03 | 0.04 | 0.03 | 0.03 | 0.03 |
|  | $Na_2O$ | 0.04 | 0.09 | 0.04 | 0.04 | 0.04 |
|  | $K_2O$ | 0.35 | 0.37 | 0.39 | 0.36 | 0.37 |
|  | Cl | 0.15 | 0.16 | 0.17 | 0.15 | 0.16 |
| Glass transition point [° C.] | | 718 | 687 | — | — | 718 |
| Thermal expansion coefficient [×$10^{-7}$/° C.] | | 37 | 44 | — | — | 30 |
| Devitrification temperature [° C.] | | <895 | — | — | — | — |
| Bubble condition | | Good | Excellent | — | — | Poor |
| Overall evaluation | | Excellent | Good | Poor | Poor | Poor |

The sample glasses of Examples 13 to 21 and Comparative Examples 4 to 6 had compositions shown in Table 4. As shown in Table 4, the number of residual bubbles in the sample glasses of Examples 13 to 21 was considerably smaller than that in Comparative Example 6. The sample glasses of Examples 13 to 21 did not contain arsenic oxide or other highly environmentally unfriendly fining agents. The devitrification temperature was 1027° C. or less, for example, in the sample glasses of Examples 13 to 20, and less than 900° C. in the sample glasses of Examples 17 to 20. This gave an excellent mark for Examples 13 to 20 in the overall evaluation.

In Comparative Examples 4 and 5, devitrification occurred during the gradual cooling of the glass melt to room temperature in a crucible that was taken out of the furnace in the preparation of the sample glass. As a result, the resulting glass body was not homogenous.

As mentioned above, the sample glass of Comparative Example 6 had considerably large numbers of bubbles, which accounted for very poor clarity.

EXAMPLES 22 to 24

Comparative Example 7

In Examples 22 to 24 and Comparative Example 7, it was confirmed that the glass compositions may include small amounts of $As_2O_5$ or $Sb_2O_3$.

Batches shown in Table 5 were prepared using the same materials used in Examples 1 to 12 and Comparative Examples 1 to 3. Arsenic pentoxide and antimony trioxide were used as the source materials of $As_2O_5$ and $Sb_2O_3$, respectively.

TABLE 5

|  |  | Example 22 | Example 23 | Example 24 | Comparative Example 7 |
|---|---|---|---|---|---|
| Blend ratio [g/batch] | Silicon oxide | 54.42 | 54.42 | 54.39 | 54.53 |
|  | Boric anhydride | 8.48 | 8.48 | 8.48 | 8.49 |
|  | Aluminum oxide | 16.29 | 16.29 | 16.28 | 16.32 |
|  | Magnesium carbonate | 2.30 | 2.30 | 2.30 | 2.31 |
|  | Calcium carbonate | 12.90 | 12.90 | 12.90 | 12.92 |
|  | Strontium carbonate | 1.94 | 1.94 | 1.94 | 1.95 |
|  | Barium carbonate | 3.47 | 3.47 | 3.47 | 3.48 |
|  | Lithium chloride | 0.081 | 0.081 | 0.081 | — |
|  | Sodium chloride | 0.024 | 0.024 | 0.024 | — |
|  | Potassium chloride | 0.050 | 0.050 | 0.050 | — |
|  | Arsenic pentoxide | 0.05 | — | 0.05 | — |
|  | Antimony trioxide | — | 0.05 | 0.05 | — |

(Preparation and Analysis of Sample Glass)

Preparation of sample glasses, quantitative analysis of sample glass compositions, clarity evaluation, and measurements of thermal expansion coefficient, glass transition point, and devitrification temperature were performed in the same manner as in Examples 13 to 21 and Comparative Examples 4 to 6. Bubble conditions of the sample glasses of Examples 22 to 24 were evaluated by comparing with Comparative Example 7.

TABLE 6

|  |  | Example 22 | Example 23 | Example 24 | Comparative Example 7 |
|---|---|---|---|---|---|
| Composition [mass %] | $SiO_2$ | 60.3 | 60.3 | 60.3 | 60.4 |
|  | $B_2O_3$ | 8.0 | 8.0 | 8.0 | 8.0 |
|  | $Al_2O_3$ | 18.0 | 18.0 | 18.0 | 18.0 |
|  | MgO | 1.0 | 1.0 | 1.0 | 1.0 |
|  | CaO | 8.0 | 8.0 | 8.0 | 8.0 |
|  | SrO | 1.5 | 1.5 | 1.5 | 1.5 |
|  | BaO | 3.0 | 3.0 | 3.0 | 3.0 |
|  | $Li_2O$ | 0.03 | 0.03 | 0.03 | 0.003 |
|  | $Na_2O$ | 0.07 | 0.07 | 0.07 | 0.06 |
|  | $K_2O$ | 0.04 | 0.04 | 0.04 | 0.001 |
|  | Cl | 0.05 | 0.05 | 0.05 | — |
|  | $As_2O_5$ | 0.05 | — | 0.05 | — |
|  | $Sb_2O_3$ | — | 0.05 | 0.05 | — |
| Glass transition point [° C.] |  | 718 | 718 | 718 | 718 |
| Thermal expansion coefficient [$\times 10^{-7}$/° C.] |  | 37 | 37 | 37 | 37 |
| Devitrification temperature [° C.] |  | <895 | <895 | <895 | <895 |
| Bubble condition |  | Excellent | Excellent | Excellent | Poor |

The sample glasses of Examples 22 to 24 and Comparative Example 7 had the compositions shown in Table 6. As shown in Table 6, the number of residual bubbles in the sample glasses of Examples 22 to 24 was considerably smaller than that in Comparative Example 7.

As mentioned above, the sample glass of Comparative Example 7 had considerably large numbers of residual bubbles, which accounted for very poor clarity.

As the foregoing results show, the present invention readily enables manufacture of glass substrates that have very few defects due to bubbles or other deficiencies, without using, or using a reduced amount of, arsenic oxide and the like.

INDUSTRIAL APPLICABILITY

The present invention provides glass compositions that are applicable to uses requiring chemical resistance, heat resistance, and a small thermal expansion coefficient.

The invention claimed is:

1. A glass substrate consisting of a glass composition that comprises, in mass %,
   40 to 70% $SiO_2$,
   5 to 20% $B_2O_3$,
   10 to 25% $Al_2O_3$,
   0 to 10% MgO,
   0 to 10% CaO,
   0 to 20% SrO, and
   0 to 10% BaO,
   and further comprises greater than 0.06% $R_2O$, and greater than 0% and no greater than 1.5% Cl,
   where R is at least one selected from Li, Na, and K, and $Li_2O$ falls in a range of 0 to 0.5%, $Na_2O$ falls in a range of 0 to 0.5%, and $K_2O$ falls in a range of 0.05 to 1.5%, all in mass %,
   wherein the content of $K_2O$ is at least two times the content of $Na_2O$.

2. The glass substrate according to claim 1, wherein the Cl content is in a range of greater than 0.09% to no greater than 1.5%, in mass %.

3. The glass substrate according to claim 1, wherein the $R_2O$ content is in a range of greater than 0.07%, in mass %.

4. The glass substrate according to claim 1, wherein the $R_2O$ content is in a range of greater than 0.06% to no greater than 1.5%, in mass %.

5. The glass substrate according to claim 1, wherein the $Li_2O$ content is in a range of 0.015 to 0.5%, in mass %.

6. The glass substrate according to claim 1, wherein the glass composition comprises 58 to 70% $SiO_2$, 8 to 13% $B_2O_3$, 13 to 20% $Al_2O_3$, 1 to 5% MgO, 1 to 10% CaO, 0 to 4% SiO, and 0 to 1% BaO, all in mass %.

7. The glass substrate according to claim 1, wherein the glass composition comprises 57 to 65% $SiO_2$, 5 to 12% $B_2O_3$, 10 to 20% $Al_2O_3$, 5 to 10% MgO, 0 to 10% CaO, and 0 to 10% SrO, all in mass %.

8. The glass substrate according to claim 1, wherein the glass composition comprises 60 to 65% $SiO_2$, 5 to 12% $B_2O_3$, 10 to 20% $Al_2O_3$, 0 to 5% MgO, 1 to 6% CaO, 0 to 10% SiO, and 0 to 1% BaO, all in mass %.

9. The glass substrate according to claim 8, wherein the glass composition comprises 9 to 12% $B_2O_3$, 10 to 15% $Al_2O_3$, and 1 to 5% MgO, all in mass %.

10. The glass substrate according to claim 1, wherein the glass composition comprises 56 to 65% $SiO_2$, 5 to 12% $B_2O_3$, 10 to 18% $Al_2O_3$, 0 to 5% MgO, 1 to 10% CaO, 1 to 10% SrO, and 0 to 1% BaO, all in mass %.

11. The glass substrate according to claim 10, wherein the glass composition comprises 2 to 5% MgO, and 3 to 10% SrO, both in mass %.

12. The glass substrate according to claim 1, wherein the glass composition comprises 56 to 60% $SiO_2$, 5 to 12% $B_2O_3$, 10 to 18% $Al_2O_3$, 0 to 5% MgO, 1 to 6% CaO, 1 to 6% SrO, and 3 to 10% BaO, all in mass %.

13. The glass substrate according to claim 1, wherein the glass composition comprises 58 to 64% $SiO_2$, 8 to 12% $B_2O_3$, 10 to 18% $Al_2O_3$, 1 to 10% MgO, 2 to 10% CaO, 1.5 to 4.5% SrO, and 1 to 5% BaO, all in mass %.

14. The glass substrate according to claim 13, wherein the glass composition comprises 15 to 18% $Al_2O_3$, 1 to 5% MgO, 3 to 8% CaO, 2 to 4% SrO, and 1 to 4% BaO, all in mass %.

15. The glass substrate according to claim 14, wherein the glass composition comprises 1 to 2% MgO, in mass %.

16. A process for producing a glass substrate consisting of a glass composition that comprises:
   melting a raw glass material to obtain the glass composition,
   wherein the glass composition comprises, in mass %,
   40 to 70% $SiO_2$,
   5 to 20% $B_2O_3$,
   10 to 25% $Al_2O_3$,
   0 to 10% MgO,
   0 to 10% CaO,
   0 to 20% SrO, and
   0 to 10% BaO,
   and the glass composition further comprises greater than 0.06% $R_2O$, where R is at least one selected from Li, Na, and K, and $Li_2O$ falls in a range of 0 to 0.5%, $Na_2O$ falls in a range of 0 to 0.5%, and $K_2O$ falls in a range of 0.05 to 1.5%, all in mass %;
   wherein the content of $K_2O$ is at least two times the content of $Na_2O$; and
   wherein a chloride is used as part of the raw glass material.

17. The process for producing a glass substrate according to claim 16, wherein the chloride content of the raw glass material is in a range of greater than 0% to no greater than 1.5%, in mass %.

18. The process for producing a glass substrate according to claim 17, wherein the chloride content of the raw glass material is in a range of 0.05 to 1.5%, in mass %.

19. The process for producing a glass substrate according to claim 18, wherein the chloride content of the raw glass material is in a range of greater than 0.09% to no greater than 1.5%, in mass %.

20. The process for producing a glass substrate according to claim 16, wherein the chloride in the raw glass material is alkali metal chloride and/or alkali earth metal chloride.

21. The process for producing a glass substrate according to claim 20, wherein the chloride in the raw glass material is potassium chloride.

22. The process for producing a glass substrate according to claim 16, wherein the chloride in the raw glass material is at least one kind of compound selected from magnesium chloride, calcium chloride, strontium chloride, and barium chloride.

23. An information display device comprising the glass substrate of claim 1.

* * * * *

UNITED STATES PATENT AND TRADEMARK OFFICE
CERTIFICATE OF CORRECTION

PATENT NO. : 7,786,035 B2
APPLICATION NO. : 11/990355
DATED : August 31, 2010
INVENTOR(S) : Kishimoto et al.

It is certified that error appears in the above-identified patent and that said Letters Patent is hereby corrected as shown below:

Column 17, Claim 6, line 49: "0 to 4% SiO" should read --0 to 4% SrO--.

Column 17, Claim 8, line 57: "0 to 10% SiO" should read --0 to 10% SrO--.

Signed and Sealed this
Twenty-eighth Day of December, 2010

David J. Kappos
*Director of the United States Patent and Trademark Office*